(12) United States Patent
Reinhart

(10) Patent No.: US 7,540,399 B2
(45) Date of Patent: Jun. 2, 2009

(54) MOTORCYCLE WITH A HOLDING DEVICE FOR A SADDLEBAG

(75) Inventor: Peter Reinhart, Peissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/516,795

(22) Filed: Sep. 7, 2006

(65) Prior Publication Data

US 2007/0062993 A1    Mar. 22, 2007

Related U.S. Application Data

(63) Continuation of application No. PCT/EP2005/004474, filed on Apr. 27, 2005.

(30) Foreign Application Priority Data

May 26, 2004   (DE) .................. 10 2004 025 748

(51) Int. Cl.
 *B62J 7/00* (2006.01)
(52) U.S. Cl. .................. 224/430; 224/413; 224/431
(58) Field of Classification Search ................ 224/430, 224/413, 431, 429, 449, 433
See application file for complete search history.

(56) References Cited

U.S. PATENT DOCUMENTS

| | | | | |
|---|---|---|---|---|
| 5,839,632 | A * | 11/1998 | Koday | 224/414 |
| 6,053,384 | A * | 4/2000 | Bachman | 224/430 |
| 6,293,450 | B1 * | 9/2001 | Aron | 224/430 |
| 6,299,042 | B1 | 10/2001 | Smith | |
| 6,499,638 | B2 * | 12/2002 | Campbell | 224/430 |
| 6,840,417 | B2 * | 1/2005 | Heinrich et al. | 224/413 |
| 7,036,837 | B1 * | 5/2006 | Bauer et al. | 280/288.4 |
| 2002/0005421 | A1 | 1/2002 | Campbell | |
| 2003/0066854 | A1 | 4/2003 | Heinrich et al. | |
| 2004/0011840 | A1 | 1/2004 | Lovett | |

FOREIGN PATENT DOCUMENTS

| | | |
|---|---|---|
| AT | 006 626 U1 | 1/2004 |
| DE | 1 742 693 | 4/1957 |
| DE | EP0245541 A3 * | 11/1987 |
| DE | 36 12 311 A1 | 12/1987 |
| DE | 40 29 712 A1 | 3/1991 |
| DE | 201 15 035 U1 | 12/2001 |
| DE | 201 14 386 U1 | 1/2002 |

(Continued)

OTHER PUBLICATIONS

German Search Report dated Jun. 21, 2005 including English Translation of relevant portion (Eight (8) pages).

*Primary Examiner*—Nathan J Newhouse
*Assistant Examiner*—Lester L Vanterpool
(74) *Attorney, Agent, or Firm*—Crowell & Moring LLP

(57) ABSTRACT

Motorcycle having a holding device which is situated in the rear-end area of the motorcycle and is provided for holding a saddlebag arranged on the side of the motorcycle, whereby the holding device has at least one tooth-like and/or cog-like form-fitting element that extends upward away from the motorcycle. The saddlebag has a recess that can be placed in a form-fitting manner on the form-fitting element. The at least one form-fitting element in turn has a hole that functions as a tie-down grommet when the saddlebag is removed.

13 Claims, 2 Drawing Sheets

FOREIGN PATENT DOCUMENTS

| | | |
|---|---|---|
| DE | 102 40 869 A1 | 4/2003 |
| DE | 101 50 055 A1 | 5/2003 |
| EP | 0 245 541 A2 | 11/1987 |
| EP | 0245541 * | 11/1987 |
| EP | 0 477 010 A1 | 3/1992 |
| EP | 0 760 332 A1 | 3/1997 |
| GB | 2 112 754 A | 7/1983 |
| GB | 2 379 431 A | 3/2003 |
| JP | 2003-212173 A | 7/2003 |
| WO | WO 96/20865 A1 | 7/1996 |

* cited by examiner

MOTORCYCLE WITH A HOLDING DEVICE FOR A SADDLEBAG

This application is a Continuation of PCT/EP2005/004474, filed Apr. 27, 2005, and claims the priority of DE 10 2004 025 748.5, filed May 26, 2004, the disclosures of which are expressly incorporated by reference herein.

BACKGROUND AND SUMMARY OF THE INVENTION

The present invention relates to a motorcycle with a holding device for holding a saddlebag mounted on the motorcycle.

Many motorcycles are equipped with saddlebags in the rear-end area. A wide variety of variants are known for mounting the saddlebags on the motorcycle.

The object of the present invention is to create a motorcycle having a holding device for attaching saddlebags, whereby said holding device has a compact design, is arranged ergonomically, blends in well with the design of the motorcycle and can be used for tying baggage when the saddlebag is removed.

The basic principle of the invention consists of a holding device which is arranged in the rear-end area of the motorcycle and is provided for holding a saddlebag situated on the side of the motorcycle, whereby the holding device has at least one tooth-like and/or cog-like form-fitting element that extends upward away from the motorcycle and has a hole. The saddlebag has a recess designed to be complementary with respect to the tooth-like and/or cog-like form-fitting element. For fastening the saddlebag, it need only be placed with its recess on the form-fitting element. The saddlebag is thus suspended with its recess in the form-fitting element and thereby automatically positioned correctly. As mentioned already, the tooth-like and/or cog-like form-fitting element has a hole. When the saddlebag is removed, the hole of the form-fitting element functions as a tie-down grommet. A tension belt, a cable or an expander can be threaded into and/or suspended from the tie-down grommet, permitting secure tying of the luggage.

The at least one tooth-like and/or cog-like form-fitting element may be arranged to extend obliquely upward away from the motorcycle, as seen in a view of the motorcycle from the front or from the rear. With respect to a vertical axis of the motorcycle, the form-fitting element may be arranged obliquely at an angle in a range between 20° and 45°. The form-fitting element preferably forms a 30° angle with a vertical axis of the motorcycle. Because of the inclined arrangement of the form-fitting element, suspension of the saddlebag is greatly facilitated. When the saddlebag is suspended, it must not be lowered vertically downward from above but instead may be brought to the form-fitting element obliquely downward from above. Another important advantage of the oblique arrangement is that a holding handle for the rider may be arranged above the at least one form-fitting element, extending in the longitudinal direction of the motorcycle, for example. Since the saddlebag is not moved vertically when placing it on or removing from the motorcycle but instead is moved obliquely, mounting and dismounting are possible with no problem, even if the holding handle is arranged directly above the at least one form-fitting element.

The holding device preferably has two such tooth-like and/or cog-like form-fitting elements that may be interconnected in one piece via a connecting section. The holding device formed by the two form-fitting elements and a connecting section may be a plastic part produced by an injection molding process. The holding device may be attached to the motorcycle frame by screws or other fastening elements.

According to one refinement of the invention, the holding element may be covered at least partially by a trim panel of the motorcycle. This permits a very attractive design. In one variant of the invention, it is possible to provide for the holding device to be arranged beneath the trim panel and for only the form-fitting element(s) to extend out of the trim panel, whereby the trim panel has appropriate resources in the area of the form-fitting elements. As an alternative to this, it is possible for the holding device to extend out of the trim panel not only with its form-fitting elements but also for a partial section of the connection section to have an attractive design and not be covered by the trim panel.

The at least one form-fitting element may be designed as a panel having two essentially parallel side faces. To make it easier to hang the saddlebag in place, it is also possible for the at least one form-fitting element to taper in the direction of its free end extending away from the motorcycle. A variety of design options are conceivable in this regard. In a side view, the form-fitting element may be designed with a prism shape and/or a triangular shape or it may have a rounded side contour similar to the shape of a gearwheel tooth.

Other objects, advantages and novel features of the present invention will become apparent from the following detailed description of the invention when considered in conjunction with the accompanying drawings.

DETAILED DESCRIPTION

Figure 1:
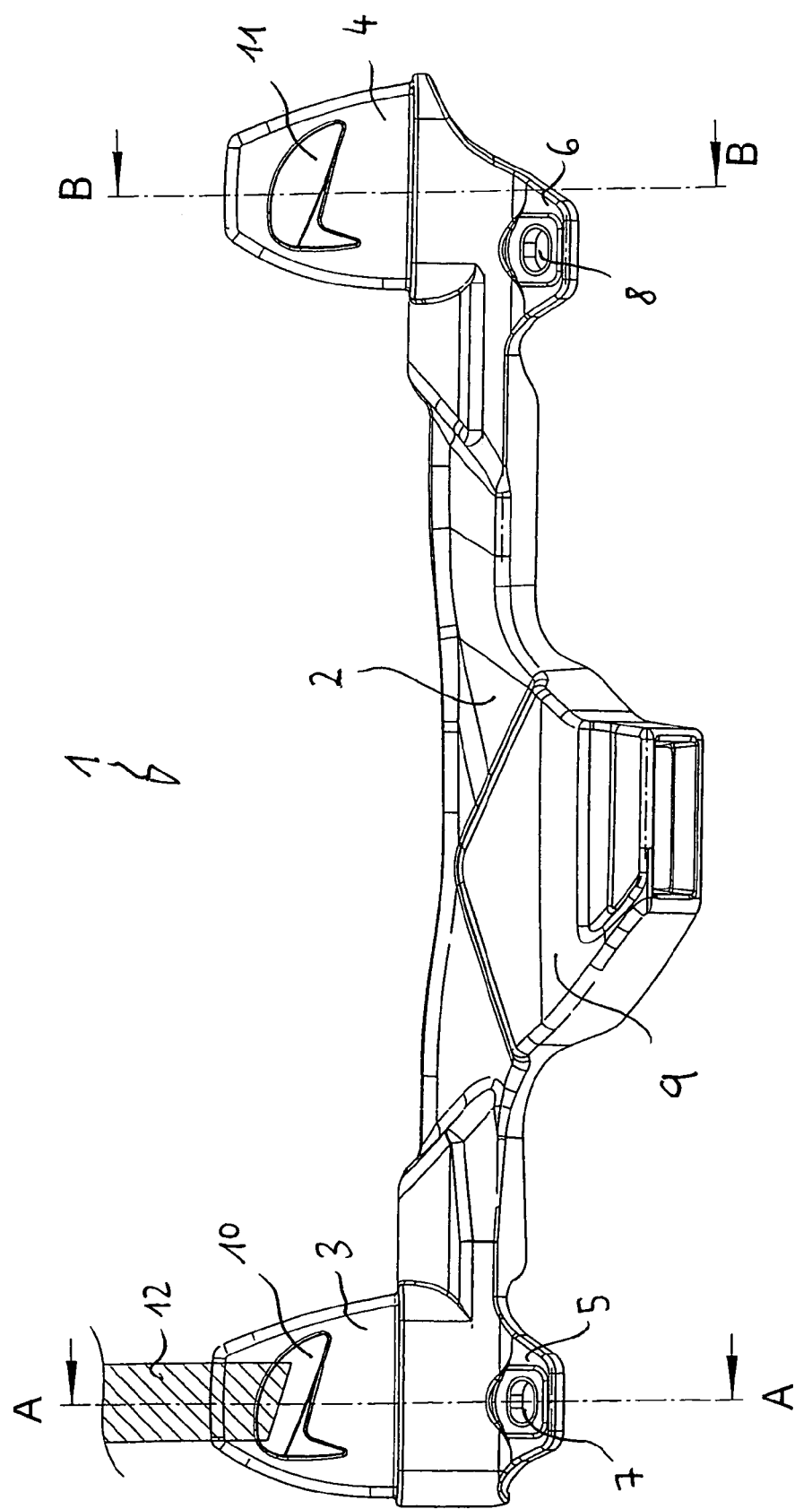
FIG. 1 shows a perspective diagram of a holding device for a motorcycle saddlebag according to an embodiment of this invention.

FIG. 1 shows a holding device 1 comprising a central, i.e., connection section 2 with a first form-fitting element 3 arranged on its first end and a second form-fitting element 4 arranged on its second end. The holding device 1 may be made of plastic in one piece. A flange 5, 6 with a respective hole 7, 8 is provided in the area of each form-fitting element 3, 4. The holding device may be attached to the frame of a motorcycle (not shown here), e.g., by means of screws through the flanges 5, 6 and other flanges provided on the back side of the holding device 1. An area 9 of the central section, i.e., the connecting section 2, may be designed as a visible section, i.e., a section not covered by the trim panel on the motorcycle.

As FIG. 1 shows, the form-fitting elements 3, 4 are designed "like teeth" in the side view shown here, i.e., comparable to the outer contour of a gearwheel tooth. The form-fitting elements 3, 4 thus taper in the direction of their free end extending away from the motorcycle. A saddlebag having a recess according to the shape of the form-fitting elements 3, 4 can therefore be suspended very easily from the form-fitting elements 3, 4 without any risk of tilting or shifting of the saddlebag. Since the form-fitting elements 3, 4 taper toward their free end, the saddlebag slides automatically into its correct position on the form-fitting elements 3, 4 when placed over them. Furthermore, the placement of the saddlebag is facilitated by the fact that the "edges" of the form-fitting elements are rounded, which is also an advantage for safety reasons.

As FIG. 1 shows, the form-fitting elements 3, 4 each have a through-hole 10, 11, the contour of which is also rounded. A low weight of the part is achieved due to the holes 10, 11. Another advantage is that the holes 10, 11 can be used as tie-down grommets for tying luggage down when the saddlebag is removed. This is indicated in FIG. 1, where a tie-down cord 12 has been threaded through the hole 10 in the form-fitting element 3. As an alternative to this, an expander or another tie-down element provided with hooks may also be suspended in the holes 10, 11 of the form-fitting elements 3, 4.

Figure 2:
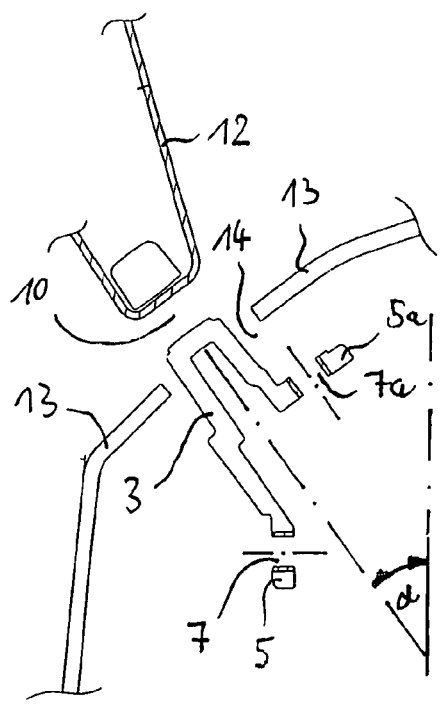
FIG. 2 shows a cross section through the holding device of FIG. 1 along sectional line A-A, whereby the form-fitting element is used as a tie-down grommet.

FIG. 2 shows a cross section through the holding device 1 from FIG. 1 along sectional line A-A. The holding device is bolted to the motorcycle frame (not shown here) through the holes 7, 7a in two flange sections 5, 5a in the area of the form-fitting element A. The middle section, i.e., the connecting section 2 (see FIG. 1) of the holding device 1 is covered by a trim panel element 13. In the area of the form-fitting elements 3, 4, the trim panel element 13 has a recess 14 through which the form-fitting element 3 extends obliquely upward. A corresponding recess may be provided for the other form-fitting element (not shown here). If, as shown in FIG. 2, no saddlebag is mounted on the motorcycle, then the form-fitting element may be used as a tie-down grommet. To do so, a tension belt 12 can be threaded through the hole 10 and/or an expander or the like may be suspended from the hole 10 of the form-fitting element. If such a holding device is arranged on the right and left sides of the motorcycle, the luggage can be tied securely to the form-fitting elements 3, 4 using appropriate tension devices.

Figure 3:
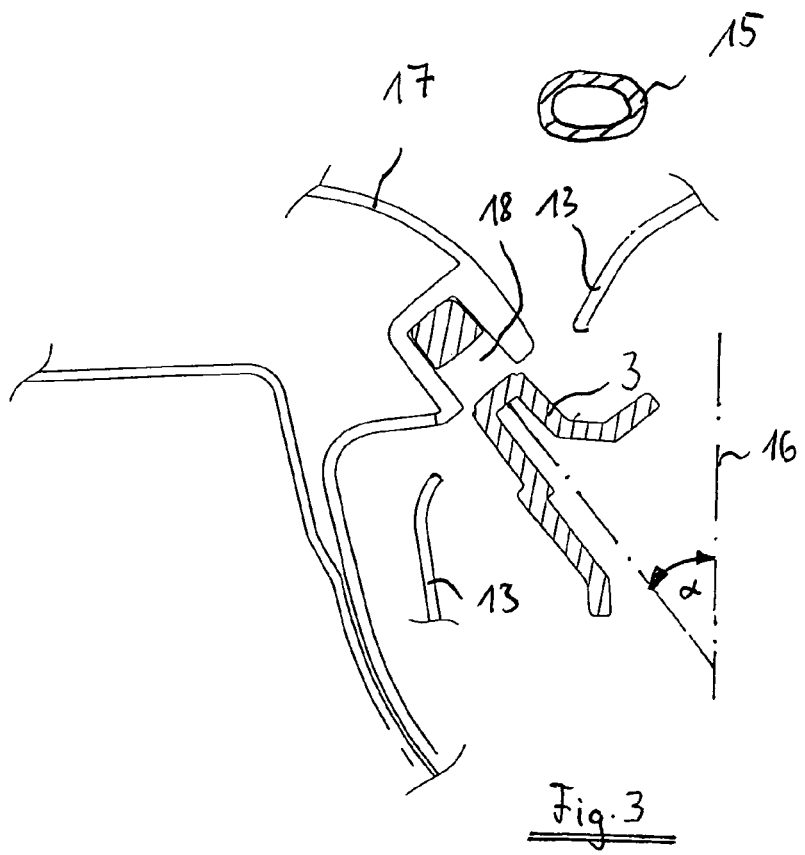
FIG. 3 shows a cross section through the holding device of FIG. 1 along sectional line B-B, whereby a saddlebag is suspended in the form-fitting element.

FIG. 3 shows a cross section through the holding device 1 of FIG. 1 along sectional line B-B. Above the form-fitting element 3, a holding handle 15 is provided, extending essentially in the longitudinal direction of the motorcycle, i.e., perpendicular to the plane of the drawing. The holding handle 15 is provided for the rider. Since the form-fitting element 3 is arranged obliquely at an angle α with respect to a vertical axis 16 of the motorcycle, the saddlebag 17 may easily be suspended obliquely from above on the form-fitting element 3 and can also be removed again easily by pulling obliquely upward. To this end, the saddlebag 17 has a recess 18 which is designed to be complementary to the form-fitting element 3. Since the form-fitting elements 3, 4 taper toward their free end, as explained in conjunction with FIG. 1, when the saddlebag 17 is suspended on the motorcycle, the recess 18 sits on the form-fitting element 3 without tilting, thereby ensuring proper positioning of the saddlebag 17.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle having a holding device for holding a saddlebag mounted on a side of the motorcycle, comprising:
   a holding device element mounted on the motorcycle; and
   at least one form-fitting element on the holding device element,
   wherein the entire at least one form-fitting element has a width and a depth, the width being greater than the depth and the width being aligned essentially parallel to a longitudinal axis of the motorcycle, said longitudinal axis being aligned with the motorcycle's front and rear wheels, and the entire at least one form-fitting element extends obliquely upward away from the motorcycle in a lateral direction perpendicular to the longitudinal axis of the motorcycle, is shaped in one of a tooth-like and cog-like manner to engage a saddlebag recess such that the at least one form-fitting element supports a portion of saddlebag weight in a vertical direction, and has a hole usable as a tie-down grommet when the saddlebag is not present on the form-fitting element.

2. The motorcycle as claimed in claim 1, wherein the at least one form-fitting element extends obliquely upward away from the motorcycle at an angle between 20° and 45° relative to a vertical axis of the motorcycle.

3. The motorcycle as claimed in claim 2, wherein the angle is 30°.

4. The motorcycle as claimed in of claim 1, wherein the holding device has two form-fitting elements.

5. The motorcycle as claimed in claim 4, wherein the two form-fitting elements are joined together in one piece by a connecting section that extends essentially in the longitudinal direction of the motorcycle.

6. The motorcycle as claimed in claim 1, wherein at least part of the holding device is covered by a trim panel of the motorcycle.

7. The motorcycle as claimed in claim 6, wherein the trim panel has a recess out of which the at least one form-fitting element extends.

8. The motorcycle as claimed in claim 5, wherein the holding device is arranged beneath a trim panel having recesses out of which the form-fitting elements extend.

9. The motorcycle as claimed in claim 1, wherein the at least one form-fitting element is in the form of a panel.

10. The motorcycle as claimed in claim 1, wherein the at least one form-fitting element tapers toward an end furthest away from the motorcycle.

11. The motorcycle as claimed in claim 1, wherein the at least one form-fitting element has a gearwheel tooth-like shape.

12. The motorcycle as claimed in claim 1, wherein the holding device is made of plastic.

13. The motorcycle as claimed in claim 1, wherein the holding device is bolted to a frame of the motorcycle.

* * * * *